US006621543B2

(12) United States Patent
Moon (10) Patent No.: US 6,621,543 B2
(45) Date of Patent: Sep. 16, 2003

(54) TRANSFLECTIVE LIQUID CRYSTAL DISPLAY DEVICE

(75) Inventor: Jong-Weon Moon, Anyang-shi (KR)

(73) Assignee: LG.Philips LCD Co., Ltd., Seoul (KR)

( * ) Notice: Subject to any disclaimer, the term of this patent is extended or adjusted under 35 U.S.C. 154(b) by 159 days.

(21) Appl. No.: 09/755,097

(22) Filed: Jan. 8, 2001

(65) Prior Publication Data

US 2001/0020990 A1 Sep. 13, 2001

(30) Foreign Application Priority Data

Jan. 6, 2000 (KR) ............................................ 2000-398

(51) Int. Cl.⁷ ............................................ G02F 1/1335
(52) U.S. Cl. ........................ 349/115; 349/117; 349/114
(58) Field of Search ............................... 349/115, 117, 349/105, 113, 114

(56) References Cited

U.S. PATENT DOCUMENTS

| | | | | |
|---|---|---|---|---|
| 5,555,114 A | * | 9/1996 | Narita et al. ................... 359/65 |
| 5,805,250 A | * | 9/1998 | Hatano et al. ................... 349/96 |
| 5,956,001 A | * | 9/1999 | Sumida et al. .................. 345/55 |
| 6,295,109 B1 | * | 9/2001 | Kobo et al. ..................... 349/119 |
| 6,333,773 B1 | * | 12/2001 | Faris ............................. 349/176 |
| 6,537,837 B2 | * | 3/2003 | Lee .............................. 438/16 |

* cited by examiner

Primary Examiner—Robert H. Kim
Assistant Examiner—Hoan Nguyen
(74) Attorney, Agent, or Firm—McKenna Long & Aldridge LLP (57) ABSTRACT

A transflective liquid crystal display device that can selectively be used in the transmissive mode or the reflective mode. The transflective liquid crystal panel includes a reflective electrode having a transparent portion, a CLC color filter and a CLC polarizer. Light from a backlight device can pass through the transparent portion of the reflective electrode and into the liquid crystal. Moreover, light from the backlight device that is reflected by the reflective electrode can also pass through the transparent portion and into the liquid crystal without being absorbed by the CLC polarizer. The brightness of the transflective LCD device is thus improved.

18 Claims, 7 Drawing Sheets

TRANSFLECTIVE LIQUID CRYSTAL DISPLAY DEVICE

This application claims the benefit of Korean Patent Application No. 2000-00398, filed on Jan. 6, 2000, under 35 U.S.C. §119, the entirety of which is hereby incorporated by reference.

BACKGROUND OF THE INVENTION

1. Field of the Invention

The present invention relates to a liquid crystal display (LCD) device, and more particularly, to a transflective LCD device.

2. Description of the Related Art

In general, a transflective liquid crystal display (LCD) device selectively acts as a transmissive LCD device and as a reflective LCD device. Due to the fact that a transflective LCD device can make use of both internal and external light sources, it can operate in bright ambient light and with low power consumption.

Figure 1:
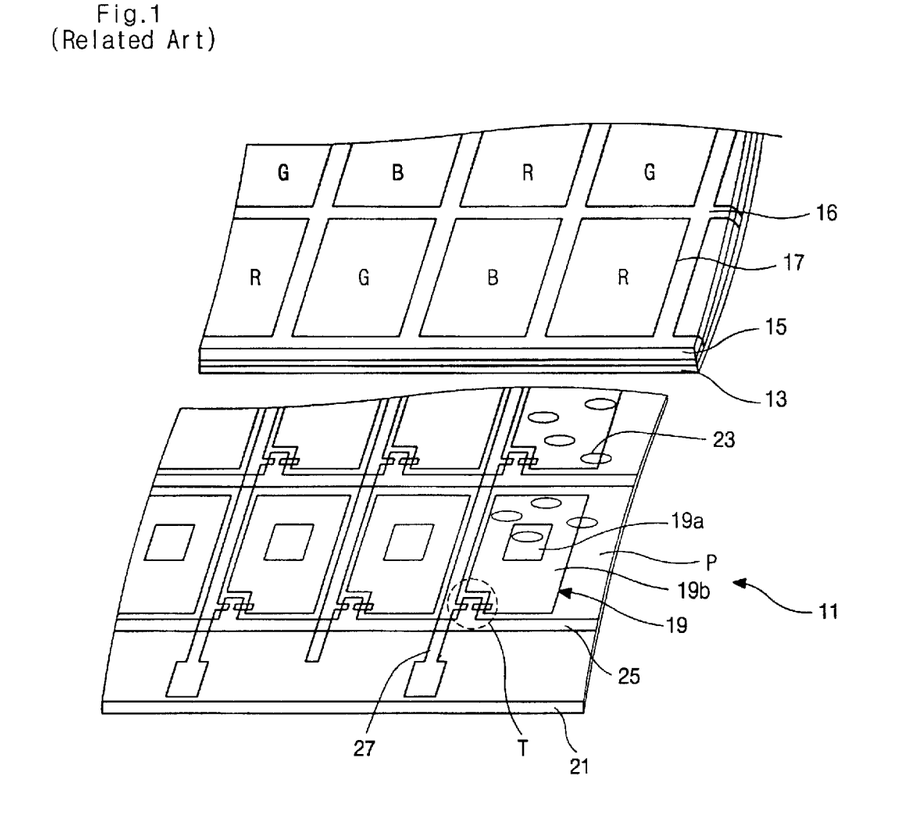
FIG. 1 illustrates a typical liquid crystal display panel.

FIG. 1 shows a typical thin film transistor liquid crystal display (TFT-LCD) device 11. The TFT-LCD device 11 includes upper and lower substrates 15 and 21 with an interposed liquid crystal 23. The upper and lower substrates 15 and 21 are sometimes respectively referred to as a color filter substrate and an array substrate.

On a surface facing the lower substrate 21, the upper substrate 15 includes a black matrix 16 and a color filter layer 17. The color filter layer 17 includes a matrix array of red (R), green (G), and blue (B) color filters that are formed such that each color filter is bordered by the black matrix 16. The upper substrate 15 also includes a common electrode 13 over the color filter layer 17 and over the black matrix 16.

On a surface facing the upper substrate 21, the lower substrate 21 includes an array of thin film transistors (one being designated as TFT "T" in FIG. 1) that act as switching devices. The array of thin film transistors is formed to correspond with the matrix of color filters. A plurality of crossing gate and data lines 25 and 27 are positioned such that a TFT is located near each crossing of the gate and data lines 25 and 27. The lower substrate 21 also includes a plurality of pixel electrodes 19, each in an area defined between the gate and data lines 25 and 27. Such areas are often referred to as pixel regions "P."

Each pixel electrode 19 includes a transparent portion 19a and a reflective portion 19b. The transparent portion 19a is usually formed from a transparent conductive material having good light transmissivity, for example, indium-tin-oxide (ITO). Alternatively, the transparent portion 19a can be a hole. However, in FIG. 1 a transparent conductive material is employed for the transparent portion 19a. Moreover, a conductive metallic material having a superior light reflectivity is used for the reflective portion 19b.

Figure 2:
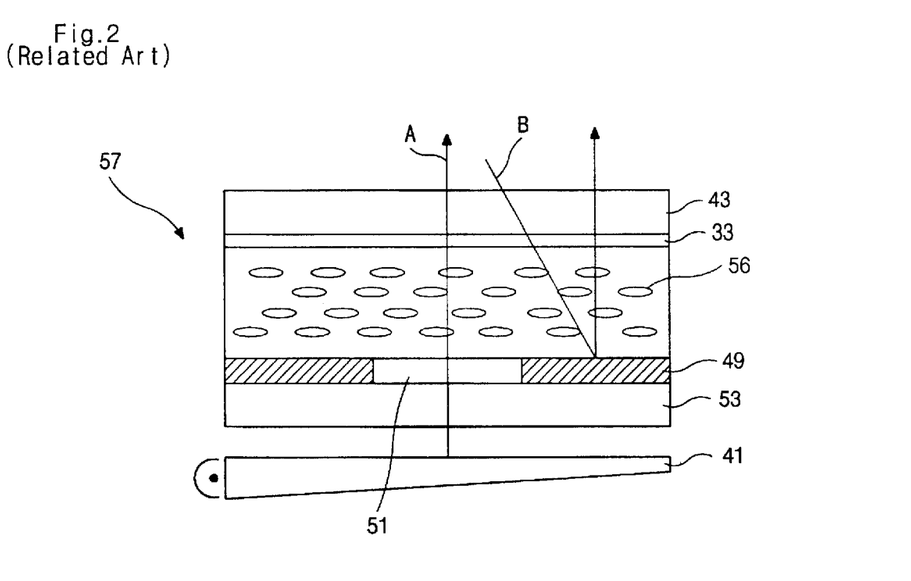
FIG. 2 is a cross-sectional view illustrating a typical transflective LCD device.

FIG. 2, a cross-sectional depiction of a transflective LCD device 57, helps illustrate the operation of such devices. As shown in FIG. 2, the transflective LCD device 57 includes lower and upper substrates 53 and 43 and an interposed liquid crystal layer 56. The upper substrate 43 includes a common electrode 33. The lower substrate 53 includes transparent and reflective electrodes 51 and 49 that act as a pixel electrode. The transflective LCD device 57 also includes a backlight device 41.

The reflective electrode 49, made of a conductive material having a good reflectivity, surrounds the transparent electrode 51. The transparent electrode 51 transmits light "A" irradiated from the backlight device 41, while the reflective electrode 49 reflects the ambient light "B."

The transflective LCD device 57 is operable in both a reflective mode and a transmissive mode. In the reflective mode, the ambient light "B" passes through the upper substrate 43 and reflects from the reflective electrode 49 back toward the upper substrate 43. With an electrical signal applied between the common electrode 33 and the pixel electrode (reflective electrode 49 and transparent electrode 51) by the switching element "T" (see FIG. 1), the phase of the liquid crystal layer 56 changes. Thus, the light "B" passing through the liquid crystal layer 56 is colored by the color filter 17 (see FIG. 1) and is displayed as a colored pixel.

In the transmissive mode, light "A" from the backlight device 41 passes through the transparent electrode 51. With an electrical signal applied between the common electrode 33 and to the pixel electrode (reflective electrode 49 and transparent electrode 51) by the switching element "T" (see FIG. 1), the phase of the liquid crystal layer 56 changes. Thus, the light "A" passing through the liquid crystal layer 56 is colored by the color filter 17 (see FIG. 1) and is displayed as a colored pixel.

As described above, since the transflective LCD device 57 has both a transmissive mode and a reflective mode, the transflective LCD device can be used anytime, day or night. It also has the advantage of being battery operable for a long time because of its low power drain. However, a significant amount of light from the backlight device is lost in the transmissive mode.

Figure 3:
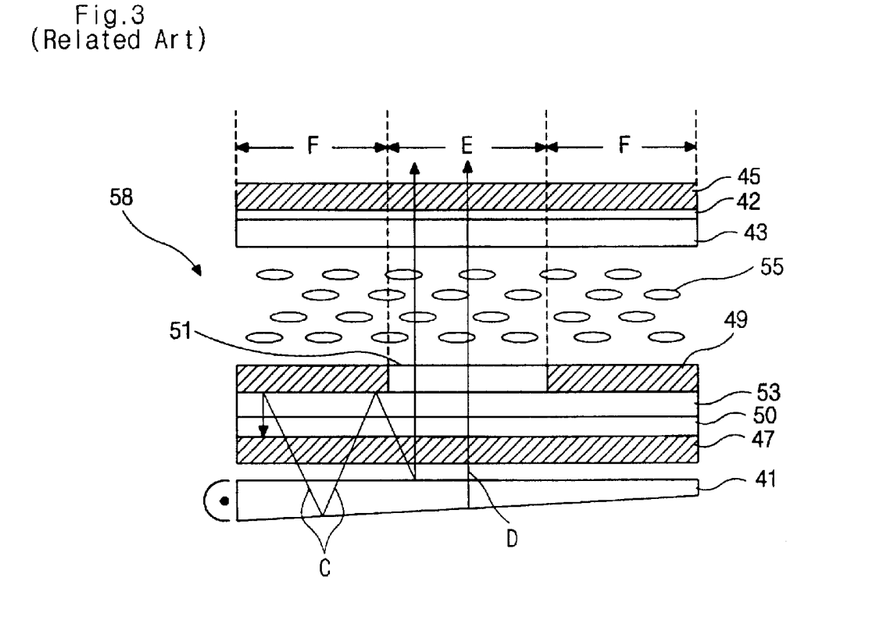
FIG. 3 is a cross-sectional view illustrating another conventional transflective LCD device.

FIG. 3 is a cross-sectional depiction of another conventional transflective LCD device 58. As shown, an upper retardation film 42 and an upper polarizer 45 are formed on an upper substrate 43. A lower retardation film 50 and a lower polarizer 47 are formed under a lower substrate 53. Moreover, a liquid crystal 55 is interposed between the upper substrate 43 and the lower substrate 53. On the inner surface of the lower substrate 53 are reflective electrodes 49 and transparent electrodes 51 (only one of each is shown in FIG. 3). The lower substrate 53 also includes gate and data lines 25 and 27 that define pixel regions "P" (reference FIG. 1). The transparent electrode 51 and the reflective electrode 49 that form the pixel electrode are in a pixel region "P."

The LCD panel 58 is divided into an open region "E" and a closed region "F," depending on whether light "C" and "D" from a backlight device 41 passes through the LCD panel 58. The closed region "F" is associated with an opaque metallic material, including the reflective electrode 49 and the gate lines 25 and data lines 27 (see FIG. 1). The open region "E" is associated with the transparent electrode 51.

In the transmissive mode of the LCD panel 58, the light "D" passes through the transparent electrode 51 into the liquid crystal layer 55. Most of the light "C" is absorbed by the lower polarizer 47 after being reflected by the reflective electrode 49. However, a small amount of the light "C" does pass through the liquid crystal 55.

Figure 4:
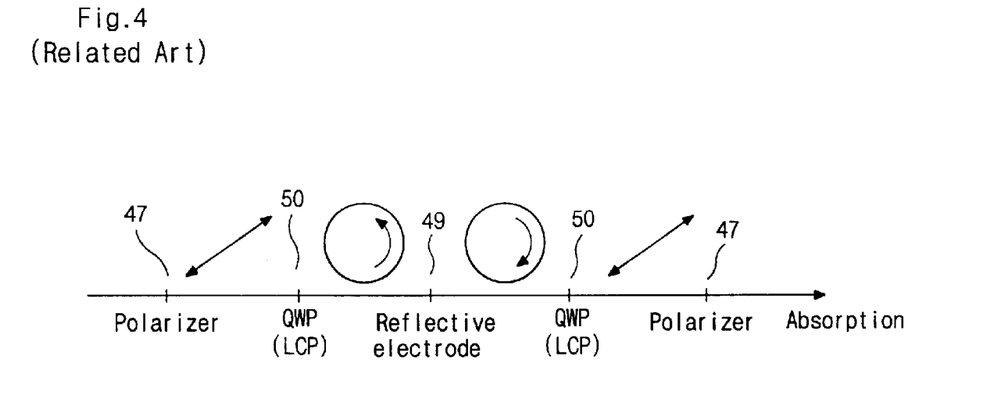
FIG. 4 is a schematic view illustrating light from a backlight device passing through components of the conventional transflective LCD device of FIG. 3.

FIG. 4 shows the states of the light from the backlight device as that light passes through the LCD panel 58. The light from the lower polarizer 47 is linearly polarized. The lower polarizer 47 absorbs much of its incident light, except that part that is parallel with the transmitting axis of the lower polarizer 47. Therefore, lower polarizer 47 significantly reduces the light density of its incident light.

The linearly polarized light that passes through the lower polarizer 47 is then changed into left-circularly polarized light by the retardation film 50, which has a phase difference of λ/4. Some of the left-circularly polarized light passes through the liquid crystal 55 associated with the open portion "E" (see FIG. 3). The remainder of the left-circularly polarized light is reflected by the reflective electrode 49 (see FIG. 3) and is changed into right-circularly polarized light due to a mirror effect. The right-circularly polarized light then enters into the retardation film 50 again, where it is converted into linearly polarized light having a phase difference angle of λ/4.

Moreover, when the linearly polarized light from the retardation film 50 enters the lower polarizer 47, the phase of the linearly polarized light is perpendicular to the transmitting axis of the lower polarizer 47. Therefore, the lower polarizer 47 absorbs most of that light.

As a result, the conventional transflective LCD device suffers a serious decrease in brightness because the closed portion "F" (see FIG. 3) associated with the reflective electrode 49 and with the gate and data lines causes a significant amount of light absorption.

SUMMARY OF THE INVENTION

Accordingly, the present invention is directed to a transflective liquid crystal display device that substantially obviates one or more of the problems due to limitations and disadvantages of the related art.

An object of the invention is to provide a method of fabricating a transflective LCD device (as well as the transflective LCD device itself) that increases the brightness by reducing or preventing light from being absorbed by a lower polarizer.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a transflective liquid crystal display device includes a first polarizer on a first retardation film, which itself is on a first substrate. A color filter is under the first substrate, and a transparent common electrode is below the color filter. A lower substrate assembly is located below the transparent common electrode. A liquid crystal layer is interposed between the transparent common electrode and the lower substrate assembly.

The lower substrate assembly includes a reflective electrode having a light passing portion. The reflective electrode is adjacent a second polarizer made of a cholesteric liquid crystal. A second retardation film is disposed between the reflective electrode and the second polarizer. The second retardation film includes a first portion, which corresponds in size to the light passing portion of the reflective electrode, that transmits light without a polarization change, and a second portion that transmits light with a phase difference of λ/4. A CLC color filter is disposed between the second polarizer and the liquid crystal layer. The lower substrate assembly further includes a backlight device having a reflective surface. The second polarizer is disposed between the backlight device and the reflective electrode. The lower substrate assembly also beneficially includes a transparent substrate.

Beneficially, the CLC color filter can be a CLC color filter layer that is disposed between the CLC polarizer and the second retardation film. Another beneficial location for the CLC color filter is in the light passing portion of the reflective electrode. Another beneficial location for the CLC color filer is in the first portion of the second retardation film. Alternatively, the CLC color filter can be located both in the first portion of the second retardation film and in the light passing portion of the reflective electrode.

In accordance with the purpose of the invention, in another aspect the principles of the present invention provide for a transflective liquid crystal display device, including: a first polarizer; a first retardation film under the first polarizer; a first substrate under the first retardation film; a color filter under the first substrate; a reflective electrode having a transparent portion, wherein the transparent portion is filled up with a CLC color filter; a liquid crystal layer interposed between the color filter and the reflective electrode; a second retardation film formed under the reflective electrode, wherein the second retardation film has a first portion that is filled up with the CLC color filter and corresponds in size to the transparent portion of the reflective electrode, also wherein the second retardation film has a second portion that transmits the light with a phase difference λ/4; a second polarizer made of a cholesteric liquid crystal and formed below the second retardation film; a second substrate formed between the second polarizer and the reflective electrode; and a backlight device arranged below the second substrate and irradiating the light to the second polarizer.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF ILLUSTRATED EMBODIMENTS

Reference will now be made in detail to illustrated embodiments of the present invention, examples of which are shown in the accompanying drawings.

Figure 5:
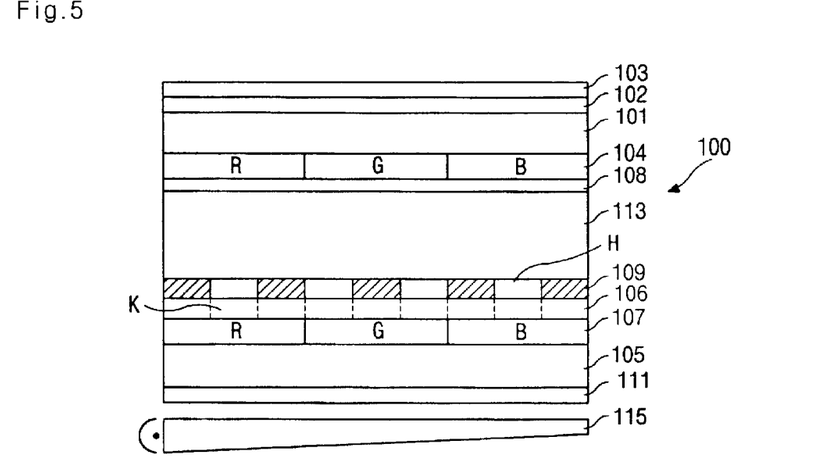
FIG. 5 is a cross-sectional view illustrating a transflective LCD device according to a first embodiment of the present invention.

FIG. 5 is a cross-sectional view illustrating a transflective LCD device according to an embodiment of the present invention. As shown, the transflective LCD device 100 includes an upper substrate 101 (a color filter substrate) and a lower substrate 105 (an array substrate). A liquid crystal layer 113 is interposed between the upper substrate 101 and the lower substrate 105.

On one surface of the upper substrate 101 is an upper retardation film 102. On the upper retardation film 102 is an upper linear polarizer 103. Color filters 104 are on the other surface of the upper substrate 101. A common electrode 108 is under the color filters 104.

On the surface of the lower substrate 105 that faces the upper substrate 101 is a cholesteric liquid crystal color filter (referred to hereinafter as a CLC color filter) 107. On that CLC color filter is a lower retardation film 106. A reflective electrode 109 is on the lower retardation film 106. The reflective electrode 109 (a pixel electrode) includes transparent portions "H." On the other surface of the lower substrate 105 is a cholesteric liquid crystal polarizer (referred to hereinafter as a CLC polarizer) 111. A backlight device 115 is adjacent the lower substrate 105.

The CLC color filter 107 is a color filter made of a cholesteric liquid crystal (CLC). It selectively reflects or transmits incident light. For example, if the molecular structure of the CLC is twisted in the right direction, the color filter 107 transmits only right-handed circularly polarized light. The CLC color filter 107 covers a plurality of pixels, and each pixel has three sub-pixels colored red (R), green (G) and blue (B).

Objects have an intrinsic wavelength. The color that an observer sees when looking at an object is the wavelength of the light reflected from or transmitted through the object. The wavelength range of visible light is from about 400 nm to 700 nm. Visible light can be broadly divided into red, green, and blue regions. The wavelength of the red light region is about 660 nm, that of green is about 530 nm, and that of blue is about 470 nm. The pitch of a liquid crystal is controllable and, therefore it is possible that a CLC color filter can selectively transmit light having the intrinsic wavelength of the color corresponding to a pixel. This enables a pixel to displaying red (R), green (G) or blue (B) with a high purity.

To implement a precise color, a plurality of the CLC color filters can be selectively arranged. Therefore, a CLC color filter can display a selected color better than a conventional reflective color filter. Moreover, the manufacturing process of CLC color filters can be relatively simple.

Referring again to FIG. 5, the CLC polarizer 111 is a polarizer made of a cholesteric liquid crystal that selectively reflects or transmits right- or left-handed circularly polarized light. Thus, it can transmit more light than a linear polarizer that transmits light polarized only in one linear direction.

Still referring to FIG. 5, the portions "K" of the retardation film 106, which correspond in size to the transparent portion "H," has an isotropic phase. Thus, light that is transmitted through a portion "K" can pass into the liquid crystal layer 113 without any phase change (in a transmissive mode). The isotropic phase portion "K" of the retardation film 106 is beneficially formed as follows. First, a UV hardening liquid crystal is first deposited and hardened. Then, the portions "K" (which correspond in size to the transparent portion "H" of the reflective electrode 109) are heated to an isotropic phase. The liquid crystal is then re-hardened by ultraviolet rays. Another method of forming the isotropic phase portion "K" is to first eliminate the portions "K" from a retardation film 106. The retardation film can then be coated with an isotropic material.

The operation of the transflective LCD device 100 when in the reflective mode is explained hereinafter with reference to FIGS. 6A and 6B, and when in the transmissive mode with reference to FIGS. 7A and 7B.

Figure 6A:
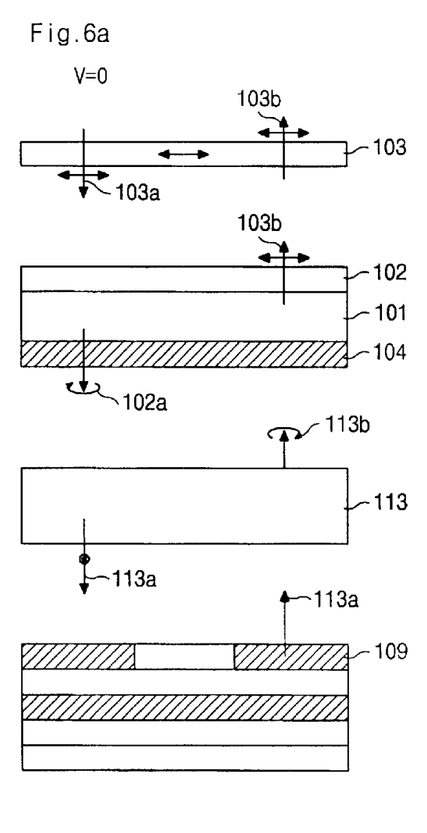
FIGS. 6a and 6b are cross-sectional views illustrating ambient light passing through components of the transflective LCD device of FIG. 5 when it is operating in a reflective mode.

Referring now to FIGS. 6A and 6B, an electrically controlled birefringence cell (ECB) is employed in the present invention (i.e., V=0, $\delta=\pi/2$ and V=$V_0$, $\delta=0$). FIG. 6A shows a reflective mode using ambient light when a signal voltage is not applied between the pixel electrode 109 and the common electrode 108 (see FIG. 5). The ambient light illuminates the upper linear polarizer 103. Only the portion of the ambient light that is parallel with the optical axis of the upper polarizer 103 passes through the upper polarizer as linearly polarized light 103a. The linearly polarized light 103a is changed into right-handed circularly polarized light 102a by the retardation film 102, which has a phase difference of $\lambda/4$. The right-handed circularly polarized light 102a passes through the upper substrate 101 and the color filter 104 and enters the liquid crystal layer 113. The right-handed circularly polarized light 102a is converted into linearly polarized light 113a as it passes through the liquid crystal layer 113. The linearly polarized light 113a is then reflected by the reflective electrode 109. The reflected linearly polarized light 113a is converted back into a right-handed circularly polarized light 113b as it passes through the liquid crystal layer 113. The right-handed circularly polarized light 113b is then converted into a linearly polarized light 103b as it passes through the upper polarizer 102. The linearly polarized light 103b is parallel to the optical axis of the upper polarizer 103, and thus passes through the upper linear polarizer 103. Thus, the LCD panel produces a white pixel.

Figure 6B:
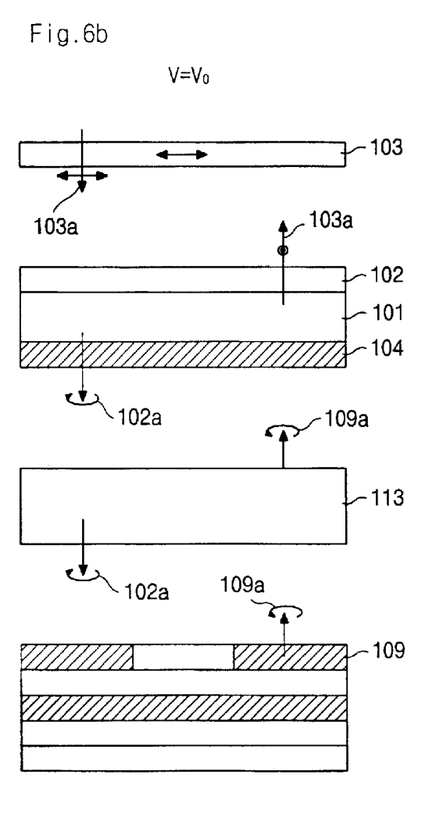

FIG. 6B shows the reflective mode using ambient light when a signal voltage is applied between the pixel electrode 109 and the common electrode 108 (see FIG. 5). The liquid crystal molecules of the liquid crystal layer 113 are then aligned in one direction, i.e., an isotropic phase. Liquid crystal molecules in an isotropic phase do not affect the phase of the incident light. Thus, incident light passes through the liquid crystal layer without a polarization change.

Accordingly, the ambient light that passes through the upper polarizer 103 as linearly polarized light 103a is converted into right-handed circularly polarized light 102a by the upper retardation film 102. The right-handed circularly polarized light 102a passes through the upper substrate 101, the color filter 104, and the isotropic liquid crystal layer 113. The right-handed circularly polarized light 102a is then reflected by the reflective electrode 109, which causes the right-handed circularly polarized light 102a to convert into left-handed circularly polarized light 109a via a mirror effect. The left-handed circularly polarized light 109a then passes through the isotropic liquid crystal layer 113, through the color filter 104, and through the upper substrate 101. The left-handed circularly polarized light 109a is converted into linearly polarized light 103a as it passes through the upper retardation film 102. The linearly polarized light 103a is perpendicular to the optical axis of the upper polarizer 103, and as such does not pass through the upper linear polarizer 103. Thus, the LCD panel results in a dark pixel.

Figure 7A:
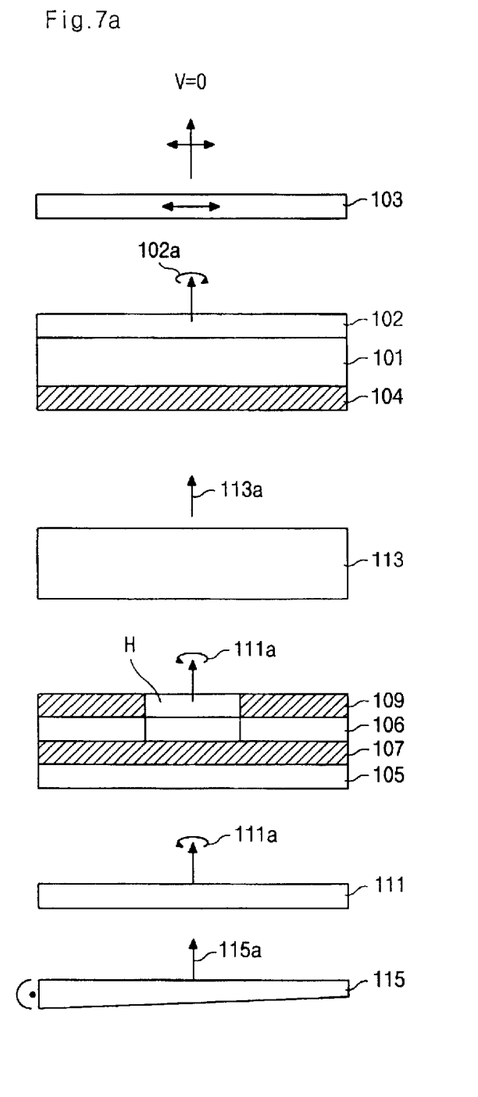
FIGS. 7a and 7b are cross-sectional views illustrating light from a backlight device passing through components of the transflective LCD device of FIG. 5 when it is operating in a transmissive mode.

FIG. 7A is a cross-sectional view of the transflective LCD device 100 operating in a transmissive mode using light from the backlight device 115 when a signal voltage is not applied between the pixel electrode 109 and the common electrode 108 (reference FIG. 5). The light 115a from the backlight device 115 enters the CLC polarizer 111. Only the left-handed circularly polarized light 111a portion of the light 115a can pass through the CLC polarizer 111. That left-handed circularly polarized light 111a then passes through the lower substrate 105; through the CLC color filter 107, which transmits a dominant wavelength such as Red, Green or Blue; through the lower retardation film 106; and through the transparent portion "H" of the reflective electrode 109 (i.e. the pixel electrode). Then, the left-handed circularly polarized light 111a is converted into linearly polarized light 113a as it passes through the liquid crystal layer 113, this being due to birefringence. The linearly polarized light 113a then passes through the color filter 104 and through the upper substrate 101. As the linearly polarized light 113a passes through the upper retardation film 102 the linearly polarized light 113a is converted into right-handed circularly polarized light 102a. Only the portion of the right-handed circularly polarized light 102a that is parallel with the optical axis of the upper polarizer 103 passes through the upper polarizer 103. Thus, the LCD panel produces a light gray pixel.

Figure 7B:
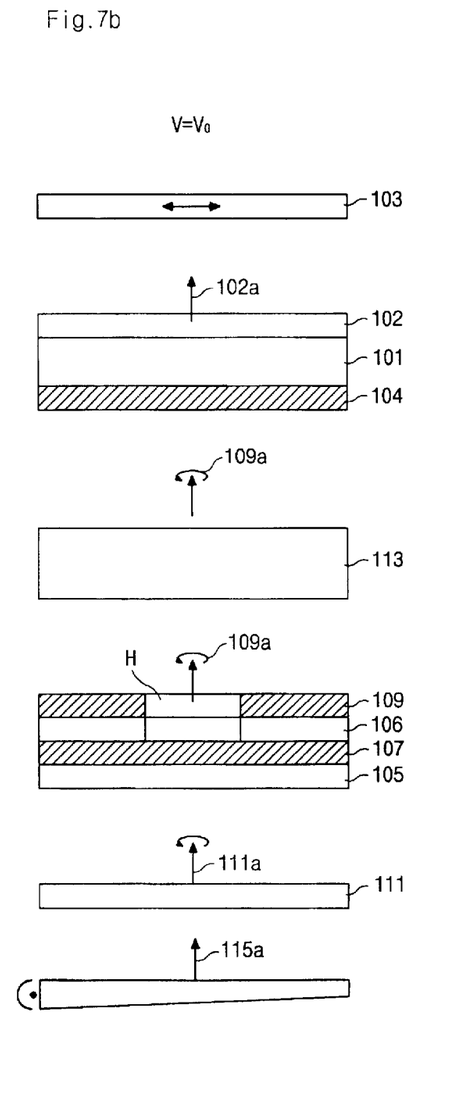

FIG. 7B is a cross-sectional view of the transflective LCD device 100 operating in a transmissive mode using light from the backlight device 115 when a signal voltage is applied between the pixel electrode 109 and the common electrode 108 (reference FIG. 5). The liquid crystal molecules of the liquid crystal layer 113 are then aligned in one direction, i.e., in an isotropic phase. Liquid crystal molecules having an isotropic phase do not affect the incident light. Thus, the incident light passes through the liquid crystal layer 113 without any polarization shift. As depicted in FIG. 7B, the light 115a from the backlight device 115 enters the CLC polarizer 111. Only the left-handed circularly polarized light 111a of the light 115a can pass through the CLC polarizer 111. The left-handed circularly polarized light 111a then passes through the lower substrate 105; through the CLC color filter 107, which transmits a dominant wavelength such as Red, Green or Blue; through the lower retardation film 106; and through the transparent portion "H" of the reflective electrode 109 (i.e. the pixel electrode). The left-handed circularly polarized light 111a leaves the transparent portion "H" as left-handed circularly polarized light 109a. The left-handed circularly polarized light 109a passes through the liquid crystal layer 113 without any polarization change. The left-handed circularly polarized light 109a then passes through the color filter 104 and through the upper substrate 101. The left-handed circularly polarized light 109a is then converted into linearly polarized light by the upper polarizer 102. The linearly polarized light 102a is polarized perpendicular to the optical axis of the upper polarizer 103, and thus does not pass through the upper linear polarizer 103. Thus, the LCD panel produces a dark pixel.

Figure 8:
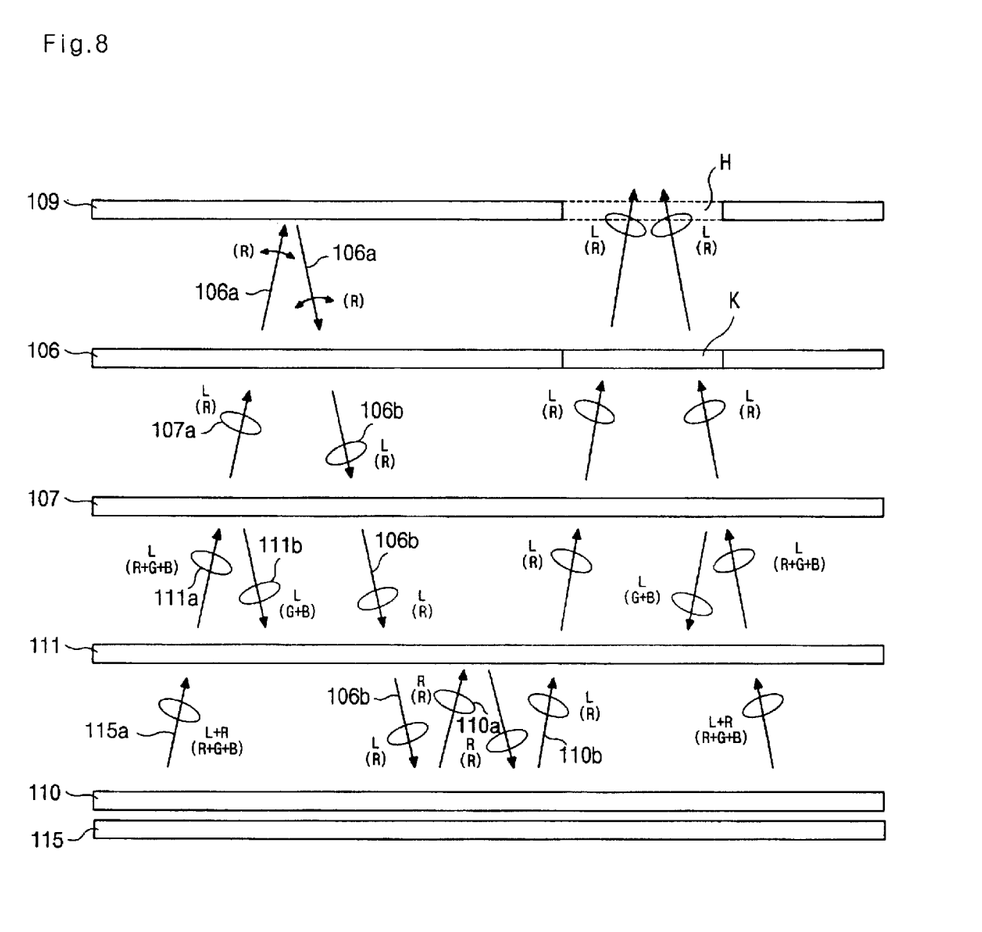
FIG. 8 is a more detailed schematic view of light from a backlight device passing through selected components of the transflective LCD device of FIG. 5 when it is operating in a transmissive mode.

FIG. 8 depicts the passage of light from the backlight device 115 through selected components of the transflective LCD device 100 of FIG. 5 when operating in a transmissive mode. While not specifically shown in FIG. 8, that light eventually enters into the liquid crystal layer 113 via the transparent portion "H" of the reflective electrode 109 (i.e. the pixel electrode). Let us suppose that the CLC color filter 107 only passes red-light, and that the color filter 104 on the upper substrate 101 (see FIG. 5) is red. In other words the CLC color filter 107 and the filter of the color filter 104 are color aligned. Operation using green and blue light is similar.

Only the left-handed circularly polarized light 111a component of the light 115a from the backlight device 115 (see FIG. 5) passes through the CLC polarizer 111. When the left-handed circularly polarized light 111a reaches the CLC color filter 107, only the red portion passes through the CLC color filter. The green- and blue-light of the left-handed circularly polarized light 111b are reflected by the CLC polarizer 107. The red portion leaves the CLC color filter 107 as red left-handed circularly polarized light 107a. The red left-handed circularly polarized light 107a is converted as it passes through the lower retardation film 106 into red linearly polarized light 106a. The red linearly polarized light 106a is then reflected by the reflective electrode 109. The red reflected red linearly polarized light 106a then re-enters the lower retardation 106 and emerges as red left-handed circularly polarized light 106b. The red left-handed circularly polarized light 106b then passes through the CLC color filter 107 and the CLC polarizer 111 without any polarization shift. The red left-handed circularly polarized light 106b is then reflected by a reflective plate 110 of the backlight device 115. The red left-handed circularly polarized light 106b is reflected as red right-handed circularly polarized light 110a via the mirror effect. The red right-handed circularly polarized light 110a is then reflected by the CLC polarizer 111 and advances toward the transparent portion "H."

The red right-handed circularly light 110a is reflected by the reflective plate 110 into red left-handed circularly polarized light 110b. Still referring to FIG. 8, the red left-handed circularly polarized light 110b passes through the CLC polarizer 111, through the CLC color filter 107, through the isotropic phase portion "K" of the lower retardation film 106, and through the transparent portion "H" of the reflective electrode 109. The action of the CLC color filter 107 and the CLC polarizer 111 leads to light from the backlight device 115 passing through the transparent portion "H" of the reflective electrode 109. Thus, a transflective LCD device having a high brightness can be achieved. Although not specifically shown in FIG. 8, the lower substrate 105 (see FIG. 5) can be located in any position on a lower substrate assembly (comprised of the reflective electrode 109, the retardation film 106, the CLC color filter 107, and the CLC polarizer 111).

Figure 9:
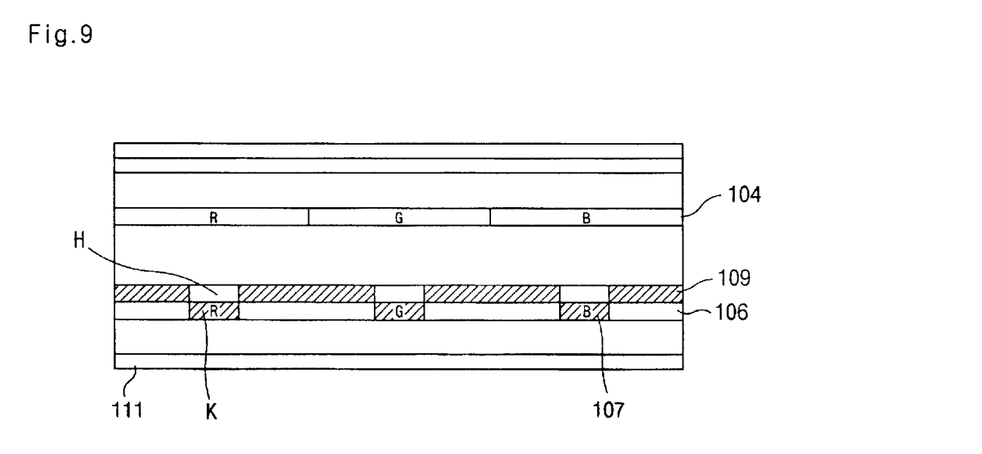
FIG. 9 is a cross-sectional view illustrating a transflective LCD device according to a second embodiment of the present invention.

FIG. 9 is a cross-sectional view illustrating a transflective LCD device according to a second embodiment of the present invention. As shown in FIG. 9, a lower retardation film 106 has isotropic phase portions "K" comprised of CLC color filters 107. The CLC color filters correspond in size with the transparent portions "H" of the reflective electrode 109. Each CLC color filter 107 transmits a dominant wavelength (color) that can pass through an associated color of the color filter 104. The remainder of the transflective LCD device is generally as depicted in FIG. 5.

Figure 10:
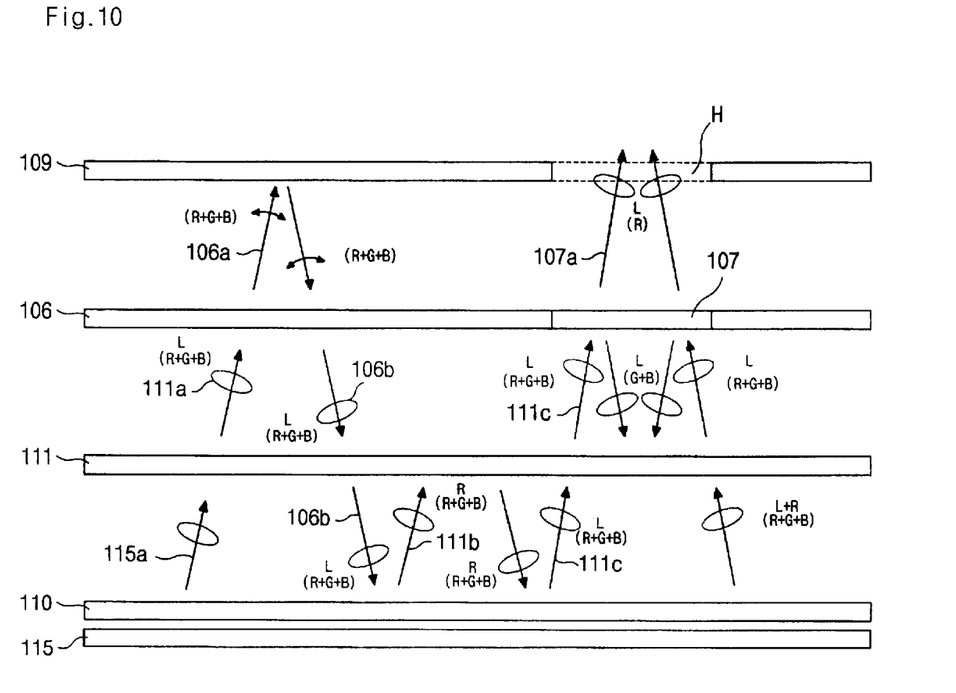
FIG. 10 is a schematic view illustrating light from a backlight device passing through selected components of the transflective LCD device of FIG. 9 when it is operating in a transmissive mode.

FIG. 10 depicts the passage of light from the backlight device 115 through selected components of the transflective LCD device of FIG. 9 when it is operating in a transmissive mode. Only the left-handed circularly polarized light 111a component of the light 115a from the backlight device 115 (see FIG. 5) passes through the CLC polarizer 111. The left-handed circularly polarized light 111a includes red-, green- and blue-light wavelengths. The left-handed circularly polarized light 111a is converted into linearly polarized light 106a as the left-handed circularly polarized light 111a passes through the lower retardation film 106. The linearly polarized light 106a is reflected by the reflective electrode 109 and re-enters the lower retardation film 106. The linearly polarized light 106a is then converted into left-handed circularly polarized light 106b as the linearly polarized light 106a passes through the lower retardation film 106. The left-handed circularly polarized light 106b passes through the CLC polarizer 11 without polarization change. Then, the left-handed circularly polarized light 106b is reflected by a reflective plate 110 of the backlight device 115. The reflection causes the left-handed circularly polarized light 106b to become right-handed circularly polarized light 111b via the mirror effect. The right-handed circularly polarized light 111b is then reflected by the CLC polarizer 111. The right-handed circularly polarized light 111b is then reflected by the reflective plate 110 and converted into left-handed circularly polarized light 111c. Thus, the reflected light advance toward the transparent portion "H." The left-handed circularly polarized light 111c then passes through the CLC polarizer 111 and to the CLC color filter 107 in the lower retardation film 106. With the left-handed circularly polarized light 111c applied to the CLC color filter 107, only the portion (say red) of the light having the wavelength of the CLC color filter 107 can pass through that color filter. Thus, a red, left-handed circularly polarized light 107a passes through the CLC color filter 107, through the transparent portion "H," and into the liquid crystal layer (not shown in FIG. 9).

As described above, the CLC color filter 107 and the lower retardation film 106 are formed in the same layer, in contrast to the embodiment illustrated in FIG. 5. Thus, the resulting transflective LCD device can be thinner, yet still have a high brightness.

Figure 11:
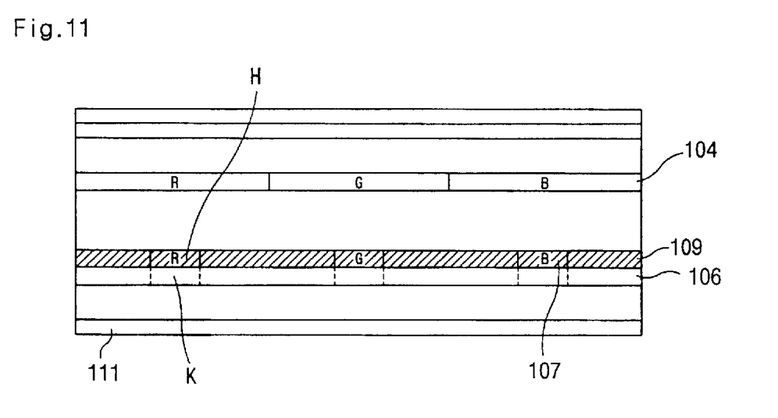
FIG. 11 is a cross-sectional view illustrating a transflective LCD device according to a third embodiment of the present invention.

FIG. 11 is a cross-sectional view illustrating a third embodiment transflective LCD device according to the principles of the present invention. As shown in FIG. 11, a CLC color filter 107 is located in what was the transparent portion "H" of the reflective electrode 109. Again, the CLC color filter 107 transmits the dominant wavelength that can pass through the associated filter of the color filter 104. In this embodiment, the portion "K" of the lower retardation film 106, which corresponds in size to the CLC color filter 107 has an isotropic phase. The remainder of the transflective LCD device is generally as depicted in FIG. 5.

Figure 12:
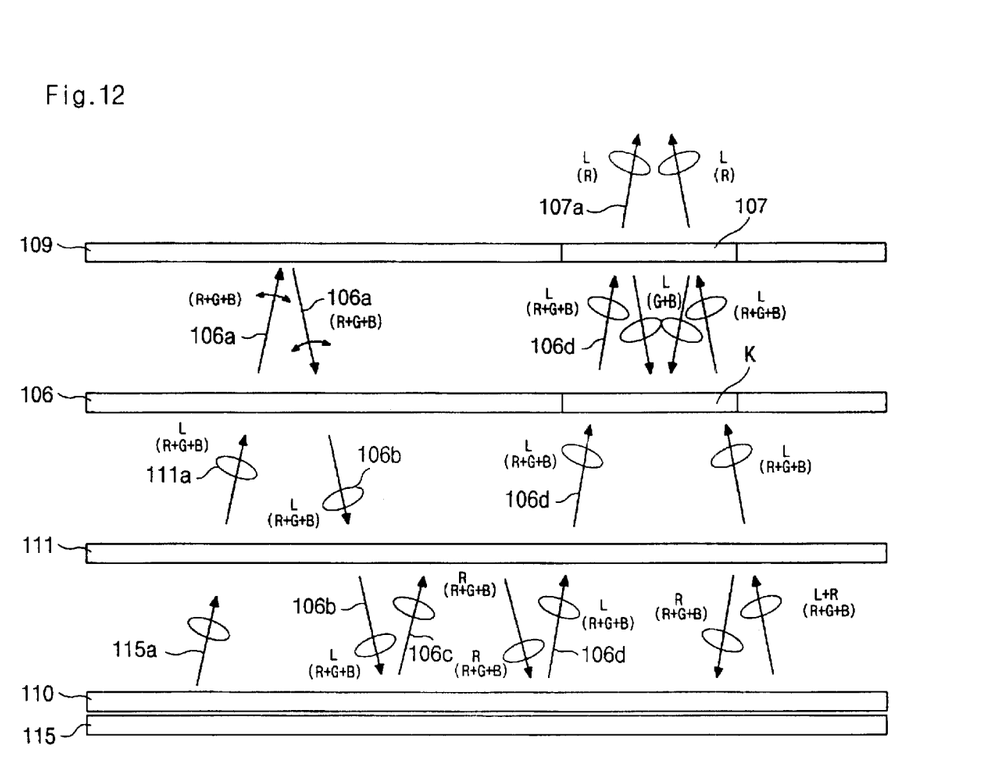
FIG. 12 is a schematic view illustrating light from a backlight device passing through selected components of the transflective LCD device of FIG. 11 when it is operating in a transmissive mode.

FIG. 12 depicts the passage of light from the backlight device 115 through selected components of the transflective LCD device of FIG. 11 when it is operating in a transmissive mode. Only the left-handed circularly polarized light 111a component of the light 115a from the backlight device 115 passes through the CLC polarizer 111. The left-handed circularly polarized light 111a has red-, green- and blue-light wavelengths. The left-handed circularly polarized light 111a is then converted into linearly polarized light 106a by the lower retardation film 106. The linearly polarized light 106a is reflected by the reflective electrode 109 and re-enters the lower retardation film 106. The reflected linearly polarized light 106a is converted into left-handed circularly polarized light 106b by the lower retardation film 106. The left-handed circularly polarized light 106b passes through the CLC polarizer 111 without any polarization change. Then, the left-handed circularly polarized light 106b is reflected by a reflective plate 110 of the backlight device 115. The left-handed circularly polarized light 106b is then reflected as a right-handed circularly polarized light 106c via the mirror effect. The right-handed circularly polarized light 106c is then reflected by the CLC polarizer 111. The reflected, right-handed circularly polarized light 106c is then reflected by the reflective plate 110 as a left-handed circularly polarized light 106d via the mirror effect. Thus, the light advances toward the isotropic phase portion "K." The left-handed circularly polarized light 106d from the reflective plate 110 passes through the CLC polarizer 111 and through the isotropic phase portion "K." The left-handed circularly light 106d then illuminates the CLC color filter 107. When the left-handed circularly polarized light 106d illuminates the CLC color filter 107 only light having the wavelength of the CLC color filter 107 (say red) can pass. Thus, only red, left-handed circularly polarized light 107a enters the liquid crystal layer.

The above-mentioned structure has a CLC color filter 107 and a reflective electrode 109 formed in the same layer, contrary to the first and second embodiments of the present invention described above.

Figure 13:
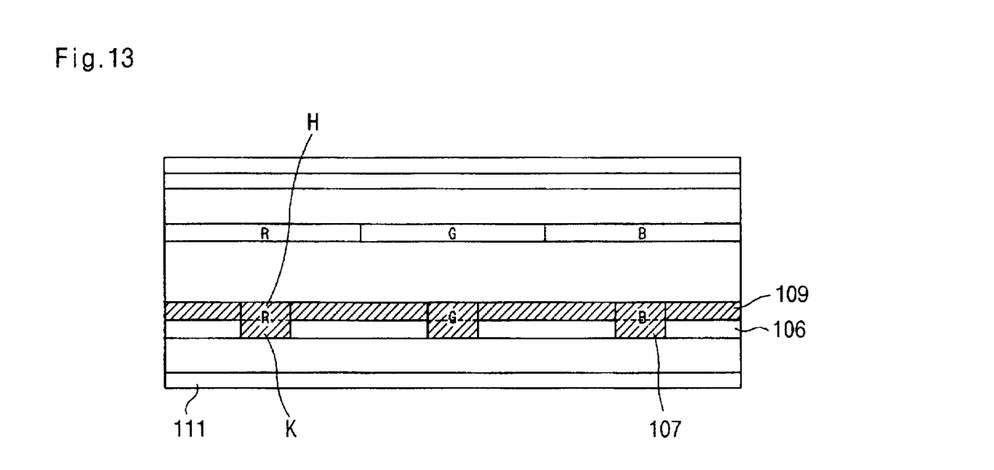
FIG. 13 is a cross-sectional view illustrating a transflective LCD device according to a fourth embodiment of the present invention.

FIG. 13 is a cross-sectional view illustrating another embodiment transflective LCD device according to the principles of the present invention. As shown in FIG. 13, a CLC color filter 107 is formed in the transmissive potion "H" of the reflective electrode 109, and in the portion "K" of the lower retardation film 106. Therefore, this structure leads to particularly high color purity. The light from the backlight device 115 as it passes through components of the array substrate according to FIG. 13 is the same as depicted in FIG. 10.

As described herein, a transflective LCD device according to the principles of the present invention includes a CLC color filter and a CLC polarizer that are arranged on the lower substrate of the transflective LCD panel (i.e., an array substrate). The light from the backlight device is not absorbed in the lower polarizer, but passes through the array substrate into the liquid crystal. Therefore, relatively good brightness can be achieved.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A transflective liquid crystal display device, comprising:
    a first polarizer;
    a first retardation film under the first polarizer;
    a first substrate under the first retardation film;
    a color filter under the first substrate;
    a reflective electrode having a light transmitting portion below the color filter;
    a liquid crystal layer interposed between the color filter and the reflective electrode;

a second retardation film under the reflective electrode, wherein the second retardation film has a first portion that transmits light without polarization change and a second portion that transmits light with a phase difference of $\lambda/4$;

a CLC color filter below the liquid crystal layer;

a second polarizer made of a cholesteric liquid crystal and formed below the second retardation film; and a backlight device arranged below the second polarizer for irradiating light toward the second polarizer.

2. The transflective liquid crystal display device according to claim 1, wherein the CLC color filter is formed in the light transmitting portion of the reflective electrode.

3. The transflective liquid crystal display device according to claim 1, wherein the CLC color filter is formed in the first portion of the second retardation film.

4. The transflective liquid crystal display device according to claim 1, wherein the CLC color filter is a color filter layer disposed between the second retardation film and the second polarizer.

5. The transflective liquid crystal display device according to claim 1, wherein the first portion of the second retardation film corresponds in size to the light transmitting portion of the reflective electrode.

6. The transflective liquid crystal display device according to claim 1, wherein the reflective electrode includes a metal.

7. The transflective liquid crystal display device according to claim 1, wherein the light transmitting portion of the reflective electrode is a transparent conductor.

8. The transflective liquid crystal display device according to claim 7, wherein the transparent conductor includes Indium.

9. The transflective liquid crystal display device according to claim 1, wherein the second polarizer passes circularly polarized light.

10. The transflective liquid crystal display device according to claim 1, wherein the second retardation film converts circularly polarized light into linearly polarized light.

11. The transflective liquid crystal display device according to claim 1, further including a second substrate between the backlight device and the liquid crystal layer.

12. A transflective liquid crystal display device, comprising:

a first polarizer;

a first retardation film under the first polarizer;

a first substrate under the first retardation film;

a color filter under the first substrate;

a reflective electrode having a light transmitting portion, wherein the light transmitting portion is filled with a CLC color filter;

a liquid crystal layer interposed between the color filter and the reflective electrode;

a second retardation film formed under the reflective electrode, wherein the second retardation film has a first portion that is filled with a CLC color filter, and a second portion that transmits light with a phase difference $\lambda/4$;

a second polarizer made of a cholesteric liquid crystal below the second retardation film; and a backlight device below the second polarizer for irradiating light onto the second polarizer.

13. The transflective liquid crystal display device according to claim 12, wherein the first portion of the second retardation film corresponds in size to the light transmitting portion of the reflective electrode.

14. The transflective liquid crystal display device according to claim 12, wherein the reflective electrode includes a metal.

15. The transflective liquid crystal display device according to claim 12, wherein the second polarizer passes circularly polarized light.

16. The transflective liquid crystal display device according to claim 12, wherein the second retardation film converts circularly polarized light into linearly polarized light.

17. The transflective liquid crystal display device according to claim 12, further including a second substrate between the backlight device and the liquid crystal layer.

18. The transflective liquid crystal display device according to claim 12, wherein said CLC color filter filters a primary color.

* * * * *